United States Patent [19]
Koch et al.

[11] Patent Number: 5,207,098
[45] Date of Patent: May 4, 1993

[54] DEVICE TO MEASURE THE LEVEL OF MATERIAL WITHIN A CONTAINER

[75] Inventors: Berthold Koch, Pützstrasse 4, D-4040 Neuss 1; Rainer Wärzelberger, Erkrath, both of Fed. Rep. of Germany

[73] Assignee: Berthold Koch, Neuss, Fed. Rep. of Germany

[21] Appl. No.: 855,305

[22] Filed: Mar. 23, 1992

[30] Foreign Application Priority Data

Apr. 8, 1991 [DE] Fed. Rep. of Germany ....... 4111271

[51] Int. Cl.⁵ .............................................. G01F 23/26
[52] U.S. Cl. .................................. 73/290 R; 73/304 C; 361/284
[58] Field of Search ................... 73/290 R, 304 C; 324/663, 664, 690; 361/284

[56] References Cited

U.S. PATENT DOCUMENTS

| | | | |
|---|---|---|---|
| 4,002,996 | 1/1977 | Klebanoff et al. | 73/304 C |
| 4,099,167 | 7/1978 | Pomerantz et al. | 361/284 |
| 4,165,641 | 8/1979 | Pomerantz et al. | 73/304 C |
| 4,201,085 | 5/1980 | Larson | 361/284 |
| 4,389,889 | 6/1983 | Larson | 73/304 C |
| 4,782,698 | 11/1988 | Wilson | 73/304 C |
| 4,810,957 | 3/1989 | Rubbmark et al. | 324/663 |
| 5,005,407 | 4/1991 | Koon | 73/304 C |
| 5,017,909 | 5/1991 | Goekler | 73/304 C |
| 5,043,707 | 8/1991 | Heinze | 73/290 R |

FOREIGN PATENT DOCUMENTS

| | | | |
|---|---|---|---|
| 2592713 | 7/1987 | France | 73/304 C |
| 0151727 | 6/1990 | Japan | 73/304 C |

*Primary Examiner*—William A. Cuchlinski, Jr.
*Assistant Examiner*—Diego F. F. Gutierrez
*Attorney, Agent, or Firm*—Pearne, Gordon, McCoy & Granger

[57] ABSTRACT

A device is disclosed to measure the level of material within containers, in particular containers in which free-flowing materials having different dielectric constants, for example water and oil, are collected. The device includes a sensor, which is arranged electrically nonconductively fashion on an outer side of the container and forms part of an electric capacitor, and an electrically conducting complementary plate, which is arranged on the inside of container opposite the sensor and spaced therefrom, which, forms another part of an electric capacitor.

3 Claims, 3 Drawing Sheets

DEVICE TO MEASURE THE LEVEL OF MATERIAL WITHIN A CONTAINER

BACKGROUND OF THE INVENTION

1. Field of the Invention

The present invention relates to a device to measure the level of material in containers and, in particular, to measure the level of free-flowing solid matter or liquids having different dielectric constants.

2. Description of Related Art

The measuring of a level of oil, water and/or emulsions thereof in open or closed containers frequently presents difficulties when using known electronic sensors. When the measuring, or the evaluation of a measuring signal, is carried out as against air as the medium, coatings and incrustations, which are caused by contaminated or viscous media contained in the containers, may form on the sensors and prevent reliable measuring.

SUMMARY OF THE INVENTION

It was found that these difficulties in respect of measuring inaccuracies could be overcome by capacitive measuring, since conducting and non-conducting media differ distinctly from one another due to their dielectric constants and measuring errors can, thus, be prevented even in the event of pollution of the surfaces.

Capacitively-functioning electric sensors produce an electric field between ground and a measuring electrode at their active measuring head. The field propagates freely in the space and is changed by a medium which penetrates into the sphere of the sensor. These changes in the electric field result in a change in the capacitance producing an oscillator switching circuit or changing the frequency thereof.

The invention is based on the object of providing a sensor which is suitable for the measuring of levels in open or closed containers and which can accurately and without difficulties detect the levels of free-flowing solid matter or liquids which may contain oil and water.

In the measuring device according to the invention, the detected medium or the medium which is to be measured forms the nonconductor of a measuring capacitor, the capacitance of which is dependent, apart from the dielectric constant of the medium, on the size of the active electrode faces and their spacing from one another.

The capacitive sensor includes floating ground electrode. Since the measuring part of the sensor can be arranged on the outside of a container, the sensor does not come into contact with the media to be inspected.

As a result of coatings on the active electrode faces resulting from deposits of the medium to be inspected, the electrode faces can short-circuit only when the medium being measured extends between said faces, as a result of which a reliable detection of the level in a container is rendered possible. When nonconducting media are contained in the container, the problem described above does not arise. Indeed, a purely capacitive measuring then takes place.

BRIEF DESCRIPTION OF THE DRAWING FIGURES

Two exemplified embodiments of a device according to the invention for the measuring of the level of containers are diagrammatically illustrated in the drawing, wherein FIG. 1 shows a partial vertically sectioned first embodiment of the device which is attached to a liquid container;

FIG. 2 shows a partially sectioned view of a second embodiment of the device which is attached to a liquid container FIG. 3 shows a front view of the part of the device of FIG. 2 which is located in the liquid container.

DETAILED DESCRIPTION OF THE PREFERRED EMBODIMENTS

Figure 1:
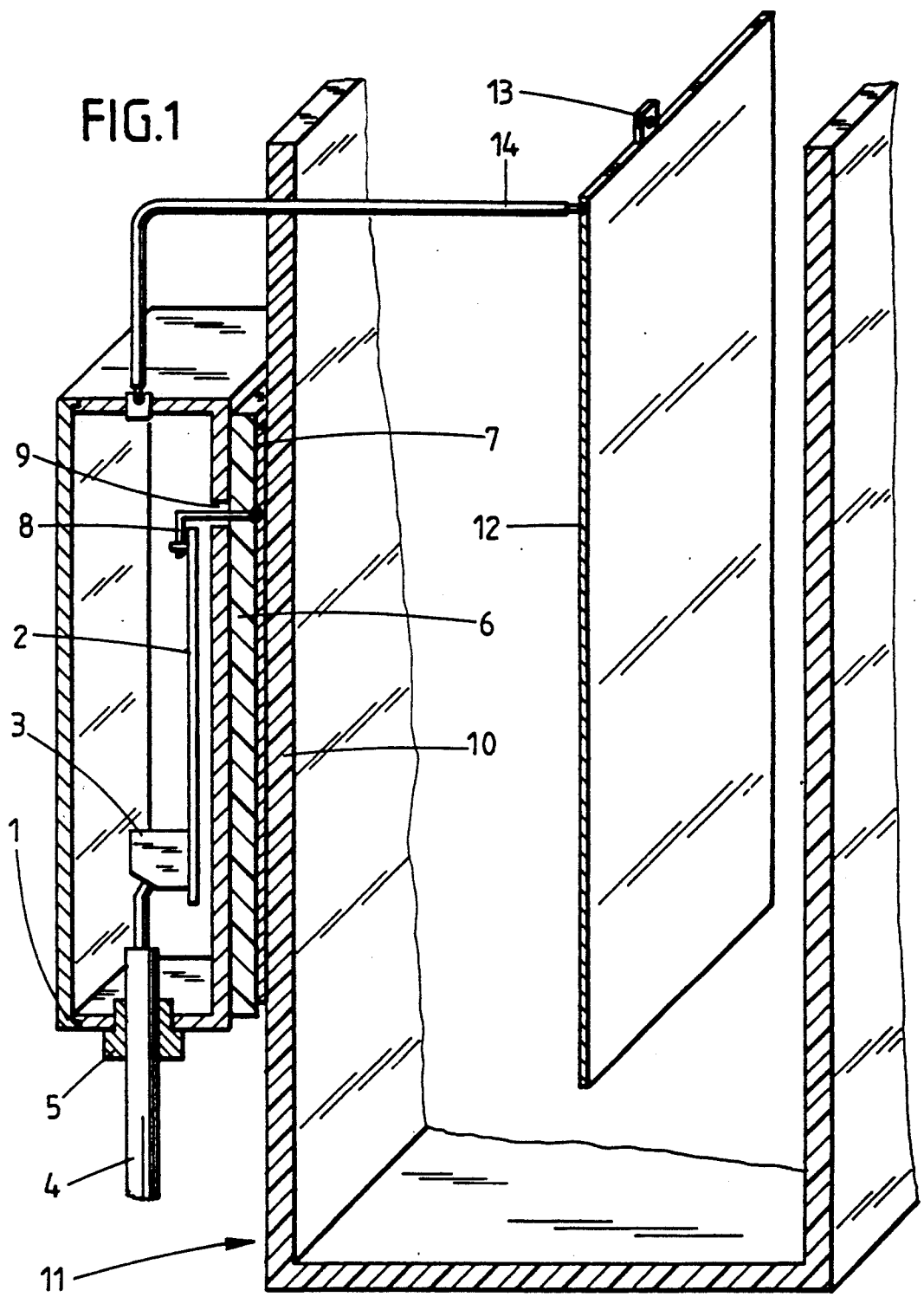

The device illustrated in FIG. 1 comprises a closed box-type housing 1 which consists at least partially of a conductive material, for example metal, and in which a measuring circuit 2 is arranged. The measuring circuit 2 communicates with electrical wiring, which is not illustrated, via a connecting piece 3 and a cable 4.

The cable 4 is directed out of the housing 1 through a cable bushing 5.

An insulating plate 6, on the outer side of which an electrode plate 7 which forms a measuring electrode, is secured to an exterior side of the housing 1. The electrode plate 7 communicates with the measuring circuit 2 via a line 8 which is guided through an opening 9 of the housing 1.

The housing 1 is disposed at ground potential. The system formed by the housing 1, the insulating plate 6 and the electrode plate 7 defines an external capacitor. The electrode plate 7 is shielded, to the greatest possible extent, from outside field influences. In this regard, the measuring circuit 2 is not in conductive communication with the housing 1, just as the line 8 does not provide an electrical connection between the electrode plate 7 and the housing 1.

The external capacitor thus formed is attached on an exterior surface of a side wall 10 of a container 11 which is composed of electrically insulating material. Within the container 11, opposite the electrode plate 7, is arranged a further electrode plate 12 which is suspended, in a manner which is not illustrated in detail by means of a lug 13, for example from the lid (not shown) of the container 11. The electrode plate 12 forms a floatingly suspended ground electrode which is electrically connected to the housing 1 via an electric line 14. In FIG. 1, the line 14 is directed through the side wall 10 of the container 11, but it can also extend outwards through the lid (not shown) over the upper rim or upper edge of the side wall 10.

This arrangement ensures a defined measuring range, especially when nonconducting media having a low dielectric constant are contained in the container 11. When conducting media form coatings or encrustations, short circuiting of the two electrode plates 7 and 12 is effectively prevented.

The arrangement formed by the measuring electrode 7, the container wall 10, the medium contained in the container and the ground electrode is a measuring capacitor with a coated nonconductor, wherein a so-called internal capacitor, which is formed by the measuring electrode 7 and by the container wall 10, and an internal measuring capacitor, which is formed by the container wall 10, the medium disposed in the container and the ground electrode 12, are connected in series. In addition to the geometric conditions, the capacitance of the internal capacitor is dependent on the dielectric constant of the nonconducting material of the container, whereas the capacitance of the internal measuring capacitor is determined by the dielectric constant of the medium contained in the container which is dependent upon the liquid level therein. Therefore, measured capacitance represents the level of liquid within the container.

Figure 2:
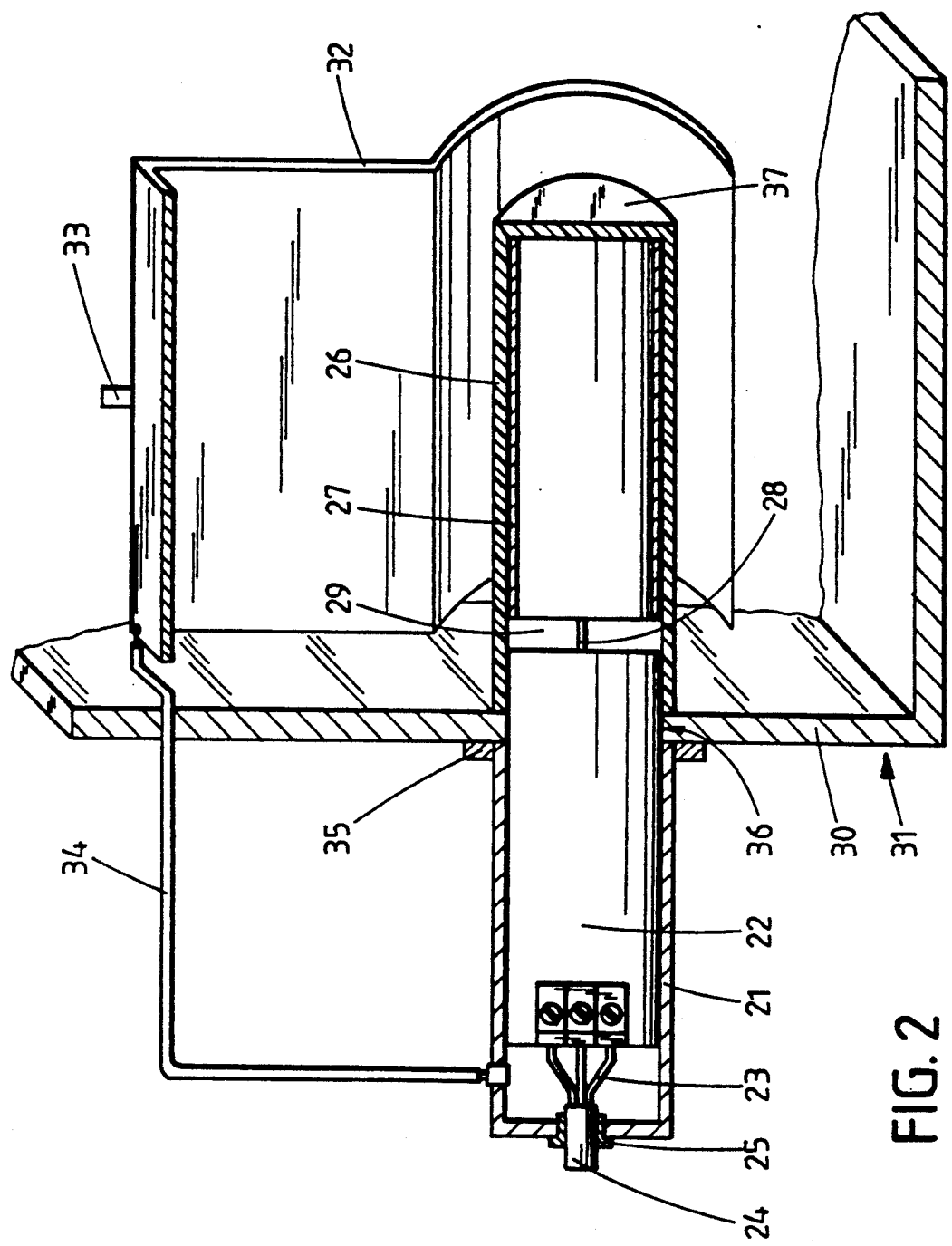
Figure 3:
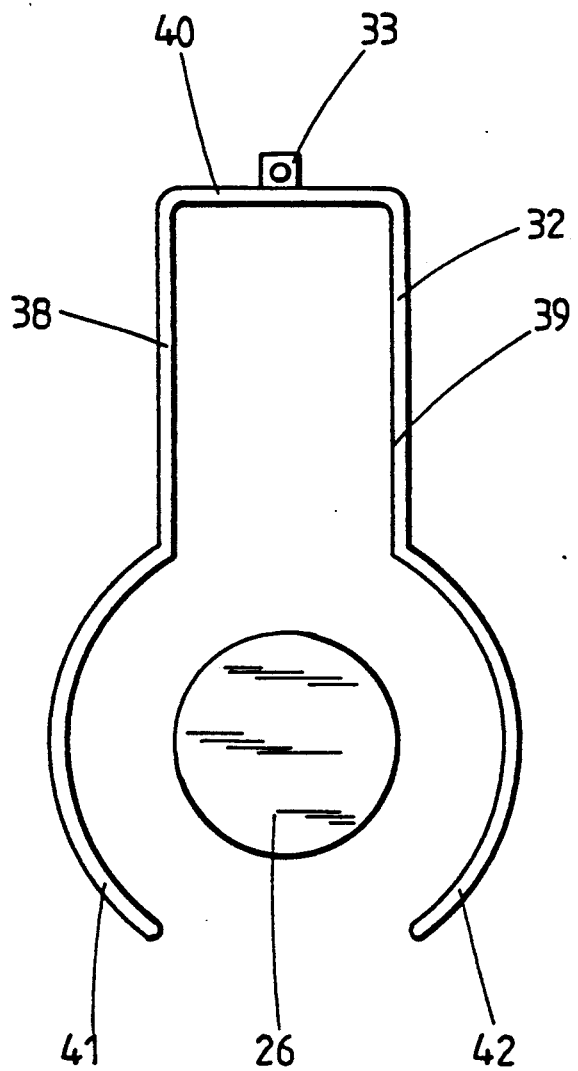

Whereas the measuring capacitor illustrated in FIG. 1 is a so-called flat sensor, FIGS. 2 and 3 show a so-called three-dimensional or rounded capacitor or sensor, which does, however, function in a manner substantially identical to that of the measuring device according to FIG. 1.

The device illustrated in FIGS. 2 and 3 comprises a tubular housing 21 which is secured to the outer side of a side wall 30 of a container 31 by means of a flange 35. A measuring circuit 22, which projects into the interior of the container 31 through an opening 36 in the side wall 30, is provided in the tubular housing 21 which is composed of aluminium. In this regard, as was the case with the housing 1 of the embodiment according to FIG 1, the housing 21 provides a shield for the measuring circuit.

The measuring circuit 22 is provided with an electrical connection 23 which is connected, via a cable 24, to electrical wiring, which is not illustrated. The cable 24 is guided outwards out of the housing 21 through a cable bushing 25.

Within the container 31, in alignment with the tubular housing 21, is arranged a nonconducting pipe 26, which corresponds, in its cross-section, to the cross-section of the housing 21. An end 37 of the pipe which is disposed in the container 31 is closed, as illustrated. The measuring circuit 22 projects into said nonconducting pipe 26, as shown in FIG. 2.

A tubular electrode 27, which commences at a spacing 29 from the measuring circuit 22 and is electrically connected thereto via a line 28, is disposed within the nonconducting pipe 26.

An electrode 32 which, when viewed frontally, is substantially U-shaped or saddle-like (FIG. 3), is arranged and suspended in the container 31 by means of a lug 33, in a manner which is not illustrated in detail. The electrode 32 is composed of electrically conductive material and is electrically connected to the housing 21, which is composed of aluminium, via an electric line 34. In the upper region, it has parallel limbs 38 and 39 which are connected by means of a crosspiece 40, to form one piece.

At the lower end, the lateral limbs 38 and 38 have outwardly bulging parts 41 and 42, respectively, which encase the pipe 26 such that the U-shaped electrode 32, which functions as a ground electrode, encases the tubular electrode 27, which serves as a measuring electrode, at a uniform spacing.

Despite a different geometric configuration, the measuring capacitor illustrated in FIGS. 2 and 3 functions in a manner substantially identical to that of the flat sensor shown in FIG. 1, in order to detect the level of a liquid contained in a container 31.

Although, in each case, only one capacitively functioning measuring device is illustrated in the drawings, a plurality of devices of this kind may be arranged on a container, so as to detect upper and lower levels and to control discharge means for the liquids contained in the container, according to said levels.

We claim:

1. A device to measure the level of material within a container, in particular a container in which free-flowing material having different dielectric constants is collected, said device comprising a sensor which is arranged in an electrically nonconducting manner to an outer side of the container, said sensor forming a part of an electric capacitor, and an electrically conducting complementary plate, said complementary plate being located within the container opposite the sensor and spaced therefrom, said complementary plate forming another part of the electrical capacitor, wherein the sensor comprises a housing which is at least partially electrically conducting and an electrically conducting capacitor plate which is electrically nonconducting relative to the housing.

2. A device according to claim 1, in which the sensor contains an electric or electronic measuring circuit which is electrically connected to the electric capacitor.

3. A device according to claim 1, wherein the housing of the sensor and the complementary plate are electrically connected to one another.

* * * * *